United States Patent [19]

Ikesue

[11] 4,234,209
[45] Nov. 18, 1980

[54] SEAT BELT

[75] Inventor: Haruyuki Ikesue, Fujisawa, Japan

[73] Assignee: NSK-Warner K.K., Tokyo, Japan

[21] Appl. No.: 959,841

[22] Filed: Nov. 13, 1978

[30] Foreign Application Priority Data

Nov. 14, 1977 [JP] Japan .......................... 52-151564[U]
Jul. 4, 1978 [JP] Japan ................................. 53-80499

[51] Int. Cl.³ ...................... A62B 35/02; B65H 75/48
[52] U.S. Cl. ............................ 280/803; 242/107.4 A;
280/806
[58] Field of Search ................. 242/107.4 R–107.4 E;
280/802–808, 469; 297/475–480, 469

[56] References Cited

U.S. PATENT DOCUMENTS

| 3,240,510 | 3/1966 | Spouge .................... 242/107.4 A X |
| 3,503,571 | 3/1970 | Martin .......................... 242/107.4 A |
| 3,834,646 | 9/1974 | Heath ....................... 242/107.4 A X |
| 4,007,802 | 2/1977 | Rosa .......................... 242/107.4 A X |
| 4,040,645 | 8/1977 | Giffen et al. ............. 242/107.4 A X |
| 4,083,581 | 4/1978 | Clifford ................................ 280/745 |
| 4,090,735 | 5/1978 | Czernakowski .......... 242/107.4 A X |

*Primary Examiner*—John M. Jillions
*Attorney, Agent, or Firm*—Shapiro and Shapiro

[57] ABSTRACT

A retractor for seat belt provided with an emergency locking mechanism is disclosed. The retractor comprises a webbing taking-up means, an inertia sensing means, a locking means and an operating means. The inertia sensing means directly senses by means of inertia a change in speed of vehicle when the change of vehicle speed exceeds a predetermined level. When the inertia sensing means senses such change of vehicle speed beyond the predetermined level, the locking means interlocked with the inertia sensing means is brought into operation to lock the pulling out of the webbing from the webbing take-up means. The operating means is movable between a first position in which it allows a free movement of the locking means and a second position in which it restrains the movement of the locking means. When there is no need for emergency locking, the operating means is held in its second position by an external order issued from the outside of the retractor.

14 Claims, 34 Drawing Figures

SEAT BELT

BACKGROUND OF THE INVENTION

1. Field of the Invention

The present invention relates to a retractor provided with an emergency locking system and a seat belt system adapted for safety belt device in various kinds of vehicles.

2. Description of the Prior Art

For safety belt devices for vehicles there has been known and widely used such type of locking mechanism which allows the webbing to be freely pulled out from and pulled back into the retractor so long as the vehicle is in its normal running state, but, when there occurs sudden change of the vehicle speed upon collision or the like, locks the webbing against the pull-out thereof so as to hold the passenger or driver for his safety in such emergency.

The known emergency locking mechanism of the type mentioned above are classified into two groups, that is, webbing pulling-out acceleration sensing type and vehicle acceleration sensing type. The emergency locking mechanism of the former type detects any sudden change of the vehicle speed caused by a collision or the like by sensing the change in speed of the pulling-out of the webbing. The emergency locking mechanism of the latter type detects it by directly sensing the change in speed of the vehicle itself.

The known retractor provided with the former type of emergency locking mechanism has that disadvantage that the locking mechanism may be actuated unnecessarily even when the webbing is pulled out from the retractor at a high speed, for example, at the time of wearing it on a passenger. This makes the handling of the safety belt device troublesome and inconvenient to the wearer. To overcome such problem it has been already proposed to hold the emergency locking mechanism in its inoperative position by actuating a holding means such as an electromagnet when no emergency locking is desired.

For the retractor provided with the latter mentioned type of emergency locking mechanism, namely the vehicle acceleration sensing type of emergency locking mechanism, however, there has been given almost no consideration to the problem of keeping the emergency locking mechanism in its inoperative position. This is because the retractor is usually mounted on a part of the vehicle such as the body of the vehicle. But, in case of a passive type safety belt system to which the passenger is forcedly fastened irrespective of his will, the retractor must be mounted on a movable part of the vehicle such as a door or the like. In this case, there is a possibility of the emergency locking mechanism being erroneously actuated during the movement of the movable part of the vehicle on which the retractor was mounted. On the other hand, if the retractor is provided with a mechanism for making the emergency locking mechanism inoperative when no emergency locking is necessary and if the retractor is mounted on a door of the vehicle, there will arise another problem in that the emergency locking mechanism may be made inoperative in emergency irrespective of the wearer's will when the door is opened for any reason in emergency.

SUMMARY OF THE INVENTION

Accordingly, it is an object of the present invention to provide a seat belt system in which the emergency locking system is brought into its inoperative position only when the wearer of the seat belt system wants it.

It is another object of the invention to provide a device which disables the emergency locking mechanism at the wearer's will when there is no need of emergency locking.

Other and further objects, features and advantages of the invention will appear more fully from the following description taken in connection with the accompanying drawings.

DESCRIPTION OF THE PREFERRED EMBODIMENTS

Figure 2:
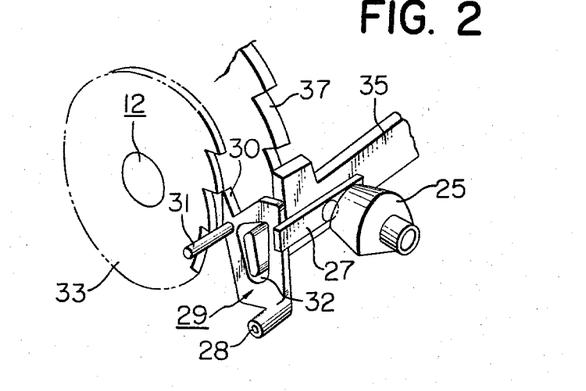
FIG. 2 is a perspective view of a retractor with an emergency locking mechanism according to the prior art.

Referring first to FIG. 2 showing a conventional retractor to which the present invention is applicable, the reference numeral 25 designates an inertia body and 27 is an arm for transmitting the change in position of the inertia body 25 when the latter is displaced in an emergency. The movement of the arm 27 is transmitted to a ratchet lever 29 formed as a link mechanism. The ratchet lever comprises a ratchet 30, a hole 32 and a projection 31 the function of which will be described in detail hereinafter.

When the ratchet lever 29 is somewhat rotated about its axis 28 counter-clockwise as viewed in the drawing of FIG. 2 by the arm 27 in an emergency, the ratchet 30 is engaged in the tooth of a ratchet gear 33. Since the gear 33 rotates about its axis 12 clockwise in an emergency, the ratchet lever 29 is further rotated counter-clockwise by the gear 33. The hole 32 of the ratchet lever receives one end of a gear stopper 35 made of a hard material and therefore with the rotation of the ratchet lever 29, the gear stopper 35 is inclined toward the tooth of a gear 37. Finally, the gear stopper 35 is engaged in the tooth of the gear 37 to stop the rotation of the gear. As a result, pulling out of an associated webbing (not shown) is stopped.

The object of the present invention is to hold the above described emergency locking mechanism in a position in which it becomes inoperative whenever no emergency locking is desired, at the wearer's own will.

To make the emergency locking mechanism inoperative, various measures may be considered. For example, the object may be attained, to some extent, by holding the inertia body 25 against movement, by holding the arm 27 against rotation or by holding the gear stopper 35 against inclination. However, for the shown type of the retractor, these measures can not solve the problem completely. None of these solutions can prevent the ratchet lever 29 from engaging in the ratchet gear 33 which may be caused by vibration or acceleration resulting from the opening and closing movement of the door in which the retractor has been mounted. When the ratchet lever 29 is once engaged in the ratchet gear 33 accidentally for any reason as mentioned above, the ratchet lever will be further driven rotating counter-clockwise by the rotational force of the ratchet gear. As a result of the rotational motion of the ratchet lever 29, the gear stopper 35 will be urged to engage in the gear 37 even when there is applied on the gear stopper 35 some force tending to hold the gear stopper 35 unmovably in its starting position.

The present invention is based on the finding that the above described object of the present invention can be attained satisfactorily by holding the ratchet lever 29 unmovably in its first position. By keeping the ratchet lever 29 in the position against movement, it becomes also possible to hold both of the arm 27 and the inertia body 25 in their places together. In the first position, the ratchet lever 29 never engages in the ratchet gear 33 and therefore it is assured that there is no possibility of the ratchet lever being accidentally rotated counter-clockwise by the strong rotational force of the gear 33.

FIGS. 1 through 4 show the first embodiment of the present invention. The parts shown in FIG. 1 in an exploded view constitute a mechanism of the first embodiment in accordance with the invention and they are to be mounted to the retractor shown in FIG. 2 at the side part thereof.

Figure 1:
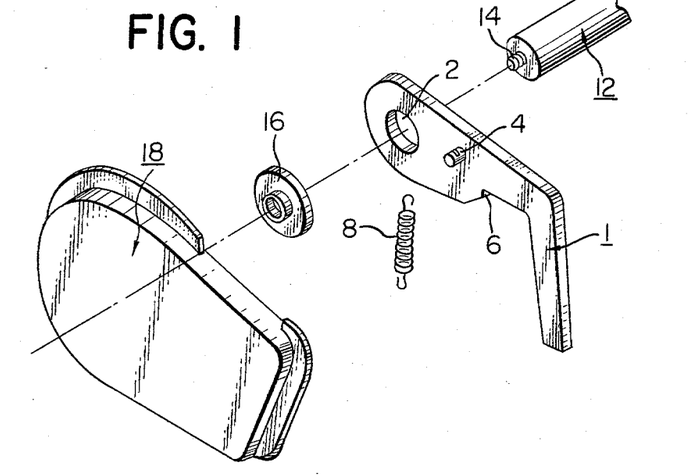
FIG. 1 is an exploded view of the mechanism according to the invention showing the first embodiment of the invention.

Designated by 1 is a lever curved at its middle portion and having an eye 2 at its one end. The lever 1 is rotatably mounted on a webbing take-up shaft 12 using the eye 2. The lever 1 has also a recess 6 provided on the inside surface of the root of the curved portion and a projection 4 provided at the intermediate area between the curved portion and the eye 2. In the shown embodiment, the lever 1 is mounted on the shaft 12 in such manner that the shaft 12 is passed through the eye 2 at first and then a retainer 16 is fitted onto a projection 14 projecting from the end of the shaft 12. Of course, any other mounting method may be employed for mounting the lever 1 rotatably on the shaft 12.

Figure 3:
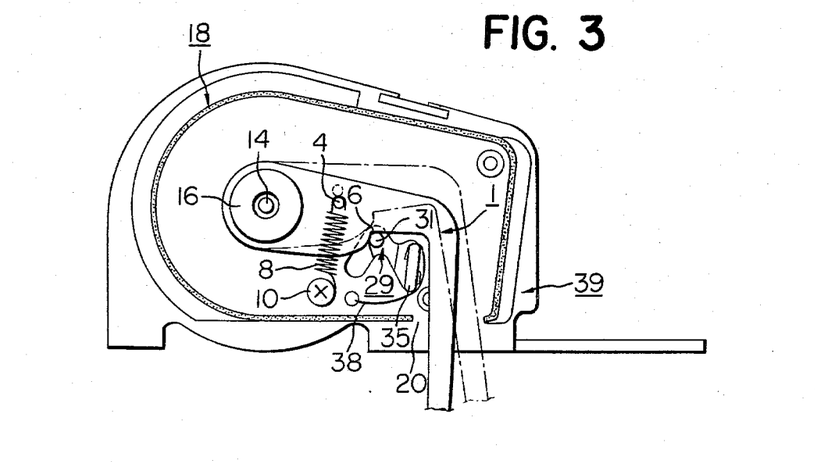
FIG. 3 is a front view, partly in cross section, of the retractor shown in FIG. 2 to which the first embodiment of the invention shown in FIG. 1 is applied.

Designated by reference numeral 8 is a coil spring serving to bias the lever. As will be seen best in FIG. 3, one end of the spring 8 is anchored on the projection 4 of the lever 1 and the other end is fixed to the base 39 of the retractor by means of, for example, a tapping screw 10. To cover these elements assembled with the retractor, there is a cover member 18 placed on the base 39 of the retractor. As seen in FIG. 3, passing through an opening of the base 39 extends the aforementioned projection 31 of the ratchet lever 29 and the end of the gear stopper 35 which also passes through the hole 32 of the ratchet lever 29. The gear stopper 35 is biased clockwise as viewed on FIG. 3 by a wire spring 38. The cover member 18 has an opening 20 through which the free end of the lever 1 extends outside the cover member.

Figure 4:
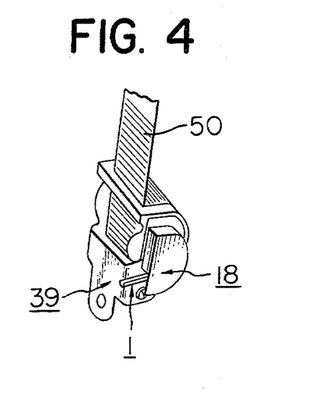
FIG. 4 is a perspective view of the whole retractor shown in FIG. 3.

The outline and overall appearance of the retractor assembled in the manner shown in FIG. 3 can be seen clearly in FIG. 4. In FIG. 4, reference numeral 50 designates a webbing. The lever 1 extending outwards through the opening 20 (FIG. 3) of the cover member 18 is clearly seen in FIG. 4.

Figure 5:
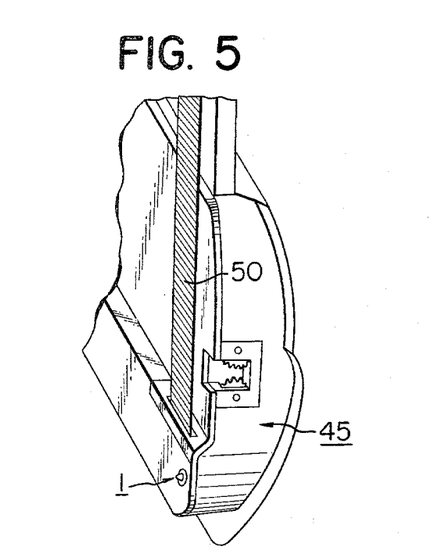
FIG. 5 shows the retractor mounted within the wall of a door.

FIG. 5 shows a concrete example of place where the extractor may be suitably mounted. In case of FIG. 5, the retractor is mounted within the wall of the lower portion of a door 45 of the vehicle, with the free end of the lever 1 extending outward from the door wall through an opening provided on the door 45.

The manner of operation of the above described embodiment is as follows.

When the door 45 is closed, the free end of the lever 1 is pushed against the stationary part of the vehicle such as the floor of the vehicle so that the lever is brought into the position suggested by the chain-dotted line in FIG. 3. In this position, the lever 1 is out of contact with the projection 31 of the ratchet lever 29 and therefore the emergency locking mechanism is allowed to work normally.

When the door 45 is opened, the lever 1 is brought into the position indicated by the solid line in FIG. 3 by the spring force of the spring 8 which tends to rotate the lever 1 clockwise. During this swing movement of the lever 1, the projection 31 is engaged into the recess 6 of the lever 1 so that the ratchet lever 29 is stopped moving further. Now, the emergency locking mechanism is kept in its inoperative position. In this position, any accidental actuation of the emergency locking mechanism which may otherwise occur due to shock on the door or the like can be prevented completely and the webbing 50 is allowed to be freely pulled out.

Since the gear stopper 35 is under the action of the wire spring 38, the gear stopper 35 is held still in the position except the time when it is inclined toward the gear 37 by the ratchet lever 29. The wire spring prevents any idle clattering motion of the gear stopper 35. It is avoidable for the gear stopper to generate the noise of clatter.

While, in the above embodiment, a lever mechanism has been particularly shown and described as the mechanism for making the emergency locking mechanism inoperative when unnecessary, any other suitable structure may be used to form the mechanism for making the emergency locking mechanism inoperative within the teaching of the present invention. For example, a solenoid ON-OFF of which is controlled by the opening and closing of the door may be used for this purpose. In this case, the ratchet lever is locked and released by excitation and deexcitation of the solenoid.

Now, referring to FIGS. 6 through 20, the second embodiment of the invention will be described in detail.

Figure 6:
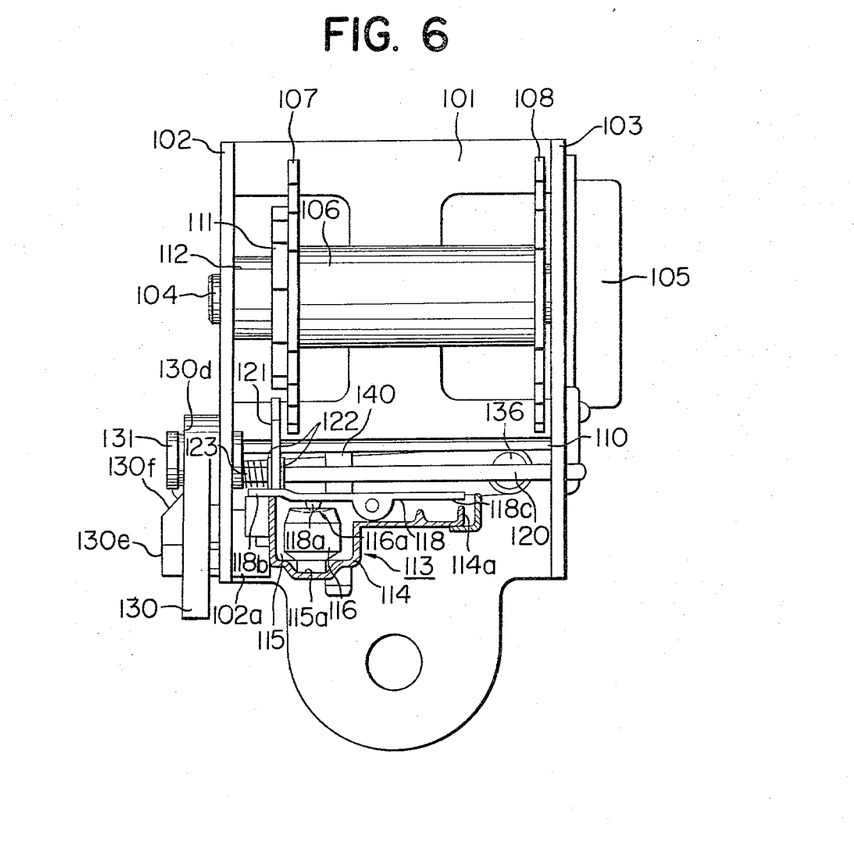
FIG. 6 shows the second embodiment of the invention.
Figure 7:
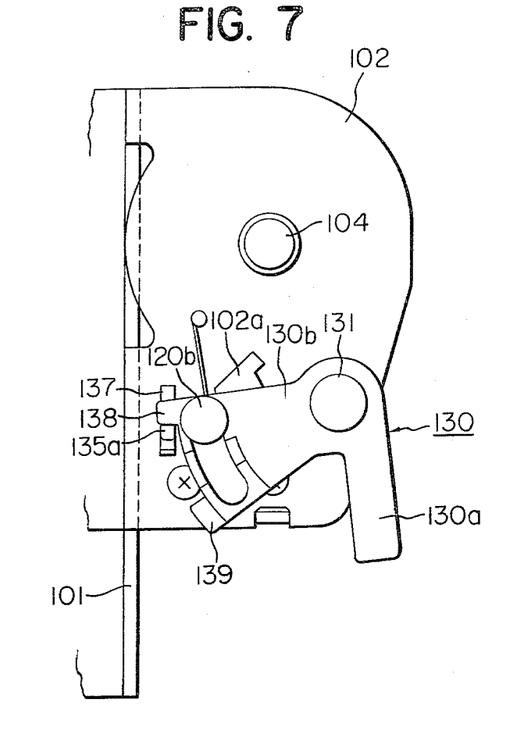
FIG. 7 is a side view thereof.

In FIG. 6 the reference numeral 101 designates a base of a retractor used in safety belt device. The base has two parallel side plates 102 and 103 integrally formed with the base. At about the middle of the length of the side plates 102, 103 there is rotatably supported a take-up shaft 104. At the right side end, as viewed in FIG. 6, of the take-up shaft 104, there is provided a taking-up spring (not shown) which tends to rotate the shaft 104 in the webbing taking-up direction. The taking-up spring is received and covered by a cover member 105 secured to the side plate 103. In the area between the two side plates 102 and 103, the take-up shaft 104 has a webbing take-up spool 106 with flanges 107 and 108 at the both ends mounted on the shaft as an integral part thereof to form together a take-up reel. On the circumference of each of the flanges 107, 108, there is formed a ratchet gear which is engageable with a locking member 110 which corresponds to the gear stopper in the first embodiment. When the ratchet gear is brought into engagement with the locking member in a manner as hereinafter described, it prevents the take-up reel from rotating in the webbing pulling-out direction so as to prevent a webbing (not shown) from being pulled out. On the take-up shaft 104 and adjacent to the above mentioned flange there is also provided a sub-ratchet gear 111 the diameter of which is smaller than that of the flange 107. The ratchet gears on the flanges 107, 108 and the sub-ratchet gear are so formed as to have the same number of gear teeth. Between the base side plate 102 and the sub-ratchet gear 111, the take-up shaft 104 has also a cylindrical spacer 112 loosely fitted on it.

Figure 12:
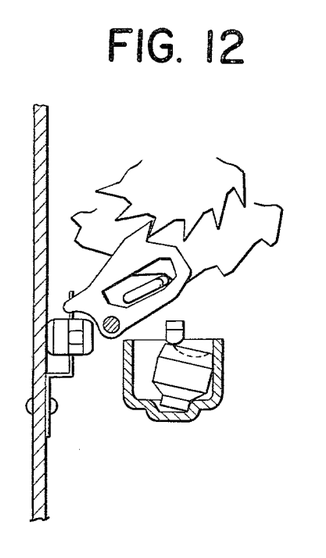
FIG. 12 is a similar view to FIG. 9 but showing it in the position in which the emergency locking mechanism is actuated.
Figure 13:
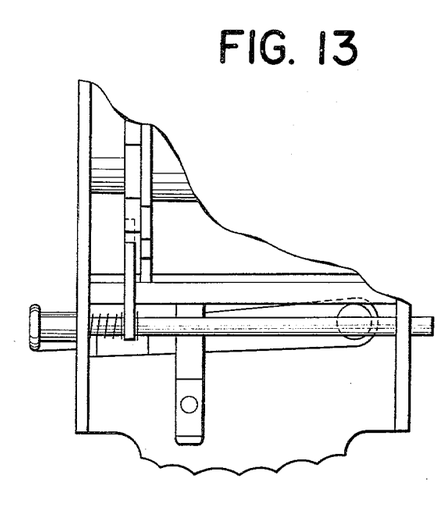
FIG. 13 is a similar view to FIG. 10 but showing it in the position in which the emergency locking mechanism is actuated.

The base side plate 102 has a supporting projection 102a integrally formed within the lower edge portion of the side plate. Fixed to the supporting projection is a casing 114 containing therein a vehicle acceleration sensing means 113. The casing 114 includes a chamber having a flat bottom surface 115a on which an inertia sensing means 116 is placed. The inertia sensing member 116 normally stands upright as shown in FIG. 6 and when any force is applied thereto as a result of change in speed of the vehicle beyond a predetermined level, it falls down as shown in FIG. 12. When the force exerting thereon is lost, the inertia sensing member returns again to its original position. Such type of inertia sensing means is well-known in the art. Of course, other type of inertia sensing means such as pendulum or ball may be used for this purpose. The inertia sensing member 116 has a recess 116a formed at its top portion to receive the projection 118a extending downwards from a lever 118 swing movably supported at the upper, middle portion of the casing. When the inertia sensing member 116 falls down, the lever 118 rotates about its fulcrum clockwise as viewed on the drawing of FIG. 6. The lever 118 has a fore end portion 118b extending toward the side plate 102 under the above mentioned sub-ratchet gear 111 and spacer 112. The sensitivity of the lever to the inclination of the inertia sensing member will be improved when the lever has a portion 118c extending in the direction opposite to the fore end portion relative to the fulcrum, that is, in the direction toward the other base side plate 103.

Figure 8:
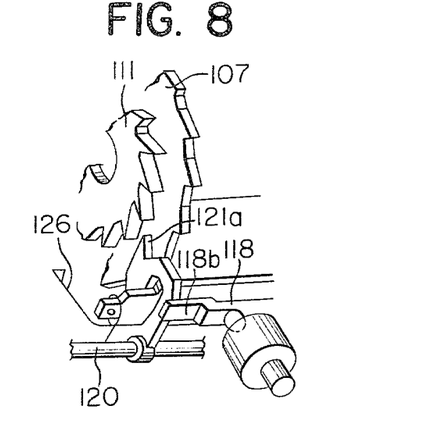
FIG. 8 is a detailed view of the emergency locking mechanism of the second embodiment.
Figure 9:
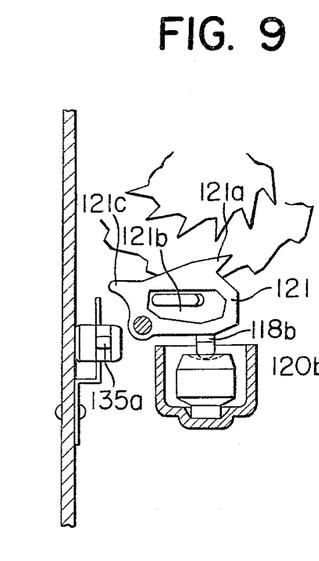
FIG. 9 shows the essential part thereof in the position in which the emergency locking mechanism is operative.
Figure 10:
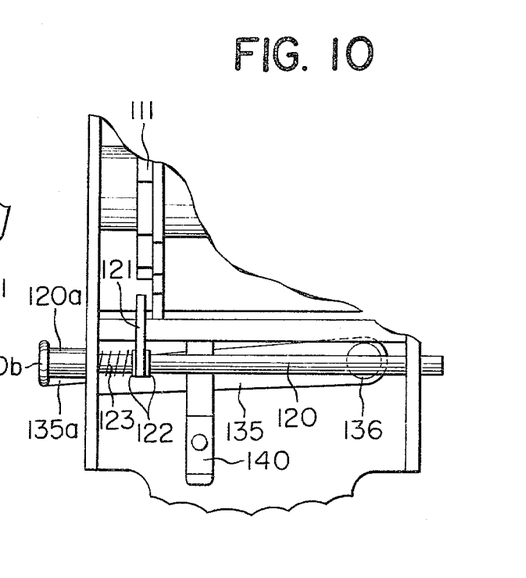
FIG. 10 is a front view thereof in the same position as that of FIG. 9 with the inertia sensing means and the external operating member being removed.

Slightly spaced upwards from the lever 118, there is a rod member 120 across the span between the two side plates 102 and 103. The rod member is mounted movably in the direction of its longitudinal axis relative to the side plates. A ratchet lever 121 serving as a sub-locking member is loose-fitted on the rod member at the end portion normally lying under the sub-ratchet gear 111. The ratchet lever 121 is rotatable relative to the rod member but not slidably movable in the direction of the rod axis because of the presence of a stop ring 122. Between the side plate 102 and the ratchet lever 121, there is interposed a weak compression spring 123 coiled around the rod member 120. As seen best on FIG. 10, the portion of the rod member projecting outwards from the side plate 102 is formed as an enlarged diameter portion 120a. Under the action of the coil spring 123, the inside end surface of the enlarged diameter portion is urged against the side plate so as to position the ratchet lever 121 just under the sub-ratchet gear 111 normally. The enlarged diameter portion terminates at an enlarged end 120b. As seen in FIGS. 8 and 9, the ratchet lever 121, in its free state, lies on the elongated fore end portion 118b of the lever 118 with its own weight. When the lever 118 swings and its fore end portion 118b rises up, the ratchet lever is rotated about the rod member 120 counter-clockwise as viewed on FIG. 9. During this counter-clockwise rotation of the ratchet lever 121 a ratchet 121a formed thereon comes into engagement with the sub-ratchet gear 111. In the middle portion of the ratchet lever 121 there is formed an opening 121b through which the locking member 110 passes. To support the locking member, the side plates 102 and 103 have sectorial openings formed therein at the positions opposed to each other (only one of the sectorial openings is visible on FIG. 7 at 102a). Normally, the locking member 110 is positioned, by its own weight and/or a spring 126 (FIG. 8) interposed between the member and the side plate 102 or 103, in a position in which the locking member can not engage with the ratchet gears formed on the flanges 107 and 108 of the take-up reel. However, when it is rotated in the sectorial openings up to its working position, the locking member comes into mesh with the ratchet gears so as to prevent the take-up reel from rotating in the webbing pulling-out direction to stop pull-out of the webbing in the manner described previously.

In emergency, the above described mechanism operates in the following manner:

At the time of collision or jamming on one's brakes, the speed of the vehicle changes abruptly and the extent of the change in speed exceeds a predetermined level. The inertia sensing member 116 senses such change in speed and inclines or falls down, which results in a rotation of the lever 118 about its fulcrum. The fore end portion 118b makes the ratchet lever 121 rotate about the rod member 120 so as to bring the ratchet 121a into the position engageable with the sub-ratchet gear 111. On the other hand, at this moment, the person wearing the safety belt on him and sitting in the vehicle falls forward due to the sudden change of the vehicle speed. As a result, the webbing is pulled out and therefore the take-up shaft and the take-up reel are rotated in the direction of webbing pull-out. The sub-ratchet gear 111 fixed on the take-up shaft is brought into engagement with the ratchet 121a of the ratchet lever so that the ratchet lever is further rotated. Since the locking member 110 passes through the opening 121b of the ratchet lever 121, the rotation of the ratchet lever causes the locking member to rotate up to the position in which the locking member comes into engagement with the ratchet gears formed on the flanges 107, 108 of the take-up reel. Thus, the take-up reel and therefore the take-up shaft are locked against rotation, and any further pulling-up of the webbing is stopped to fasten the safety belt upon the wearer (see, FIGS. 12 and 13).

Figure 11:
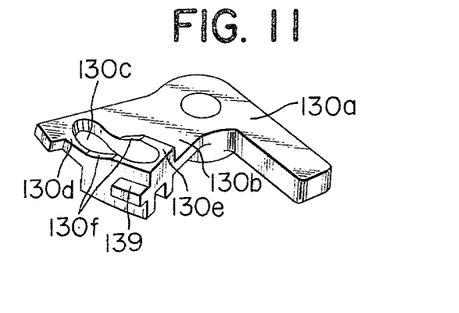
FIG. 11 is a perspective view of the external operating member.

FIG. 11 shows an external operating member 130 used to externally operate the above described emergency locking mechanism. The external operating member is mounted on the outer side surface of the base side plate 102 by a pivot member 131 secured to the side plate 102. The pivot member 131 supports the operating member 130 rotatably about the pivot. The external operating member comprises an operating lever portion 130a and a branched lever portion 130b. The operating lever portion is operable with hand or by other suitable means linked with the portion as will be described hereinafter. The branched lever portion is branched from the operating lever portion with a certain angle to the latter. The branched lever portion is in a shape of a sector diverging from the pivot member with a certain angle of divergence. In the vicinity of the periphery of the sector, there is formed an arcuate slot 130c the center of which lies in the pivot member 131. The arcuate slot is passed through by the enlarged diameter portion 120a of the rod member 120 described above. The width of the slot is sufficiently larger than the diameter of the enlarged diameter portion 120a but it is smaller than the diameter of the enlarged end 120b of the rod member. As can be seen best on FIG. 11, the surface surrounding the arcuate slot 130c is formed as a cam surface comprising a lower cam surface portion 130d at one end of the slot, a higher cam surface portion 130e at the other end, a sloped cam surface portion 130f at the intermediate part of the slot. These three surface portions are contiguous to each other to form a cam part. Since, as previously noted, the enlarged end 120b of the rod member 120 is in contact with the cam surface, the rod member 120 can be slide moved in its axial direction as a cam follower when the operating member 130 is externally rotated about the pivot member 131. Thus, when the enlarged rod end 120b is in contact with the lower cam surface portion 130d, the rod member 120 takes a position farthermost rightwards as shown in FIG. 6. In this position, the ratchet lever mounted on the rod member 120 and the sub-ratchet gear 111 are in alignment with each other in a direction normal to the axis. Therefore, in this position, emergency locking in the previously mentioned manner may be effected.

Figure 14:
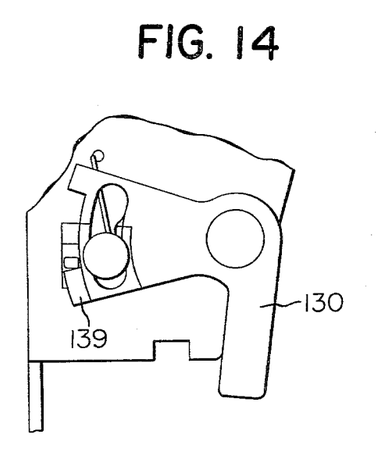
FIG. 14 is a side view of the external operating member which is rotating.

When the external operating member 130 is rotated by a force externally applied to the operating lever portion 130a counter-clockwise up to the position shown in FIG. 14, the rod member 120 is moved leftwards against the force of the compression spring 123 so that the ratchet lever 121 is brought to the position out of alignment with the sub-ratchet gear 111. In this position, the ratchet lever 121 can not engage with the sub-ratchet gear 111 and now the emergency locking mechanism becomes inoperative.

Figure 15:
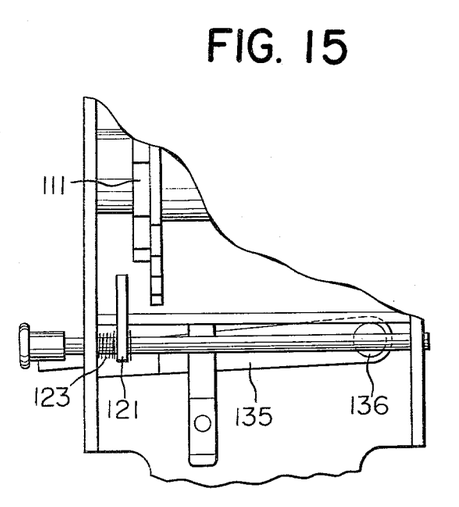
FIG. 15 is a similar view to FIG. 14 but showing the part in the position corresponding to that of FIG. 14.
Figure 16:
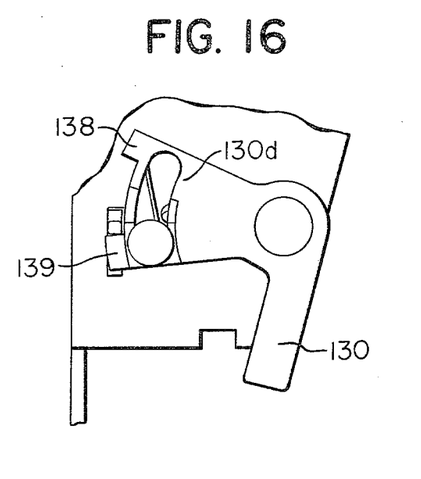
FIG. 16 is a side view of the external operating member in the position in which the emergency locking mechanism is inoperative.
Figure 17:
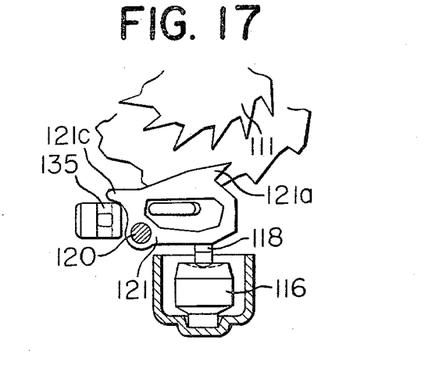
FIG. 17 is a similar view to FIG. 9 but showing the part in the position corresponding to that of FIG. 16.
Figure 18:
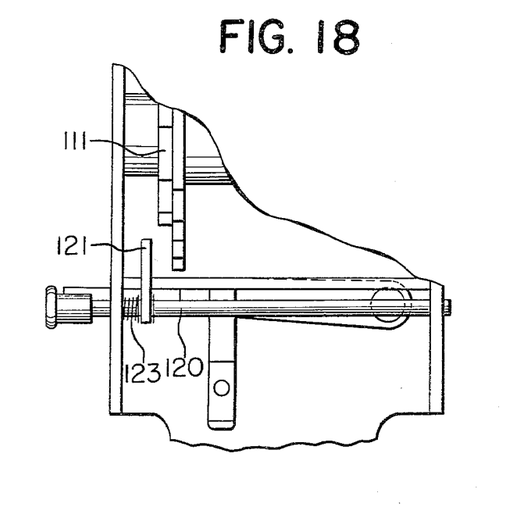
FIG. 18 is a similar view to FIG. 10 but showing the part in the position corresponding to FIG. 16.

In this embodiment, there is provided also a swing lever 135 on the inside of the base 101. The swing lever 135 is supported by a pivot pin 136 swing movably about the pin and extends nearly parallel with the rod member 120. The swing lever 135 passes through a vertical slot 137 (FIG. 7) formed in the side plate 102. The portion of the swing lever projecting outwardly beyond the slot 137 is formed as an extension part 135a engageable with the first and second projections 138 and 139 formed on the periphery of the sector of the branched lever portion of the external operating member 130. The first and second projections 138 and 139 correspond to the above mentioned lower and higher cam surface portions 130d and 130e respectively with respect to their positions. At the time when the external operating member 130 is in the position shown in FIG. 7, the swing lever 135 takes the downward rotated position (see, FIGS. 6 and 10) since the first projection 138 has pushed down the extension part 135a of the swing lever. When the external operating member 130 is rotated clockwise from the position of FIG. 7 by an external force, the swing lever 135 remains in the position mentioned above until its extension part 135a is contacted by the second projection 139 (FIGS. 14 and 15). Upon the contact with the second projection, the swing lever is rotated upwards (FIGS. 16–18). The swing lever is under the action of a leaf spring 140 attached to the base 101 to prevent idle movement of the swing lever. The leaf spring 140 has a force intending to urge the swing lever against the base. Therefore, after the swing lever has been once moved to the upward rotated position shown in FIGS. 17 and 18 by externally rotating the operating member 130 clockwise, the swing lever is held in the position by the leaf spring 140 and it never rotates by its own weight even when the external operating member 130 is again rotated counter-clockwise. The swing lever remains in the position until the first projection 138 comes into contact with the extension part 135a of the swing lever.

As seen in FIG. 9, the ratchet lever 121 includes further a projection 121c projecting toward the base 101 from the upper portion of the ratchet lever. The projection 121c lies in the course of the rotational movement of the swing lever 135. When the swing lever is in the downward rotated position shown in FIGS. 9 and 10, the projection can not engage with the swing lever and therefore the ratchet lever is free from the swing lever. However, when the swing lever reaches the upward rotated position shown in FIGS. 17 and 18, the swing lever comes into contact with the projection 121c of the ratchet lever 121 so as to rotate it clockwise about the rod member 120. Thereby, the ratchet gear 121b is brought into the position in which it can not engage with the sub-ratchet gear 111 and the ratchet gear is held in the position by the swing lever. In this position, the ratchet lever 121 holds the inertia sensing member 116 in its right standing position through the lever 118 as clearly seen on FIG. 17. Therefore, assuming that the rod member 120 does not move in its axial direction in the previously mentioned manner, the shift of the emergency locking mechanism to the inoperative position can be made by using the swing lever 135 which is rotated by the external operating member 130 to cause a rotation of the ratchet lever in the manner mentioned above. In this embodiment, the ratchet lever is brought into its inoperative position by rotating it. But, the ratchet lever may be designed in such manner that it can be shifted into the inoperative position as a whole and held in the position.

While the movements of the ratchet lever 121 into its inoperative position through the rod member 120 and through the swing lever 135 have been described independently of each other, these two movements will be described together hereinafter in connection with the manner of operation of the second embodiment.

As already mentioned, in the position shown in FIGS. 6 through 10, the emergency locking mechanism is operative to effect locking in an emergency in the manner previously described.

Starting from the position, if the external operating member 130 is rotated clockwise by a motion interlocked with the opening or closing movement of the door or by an external force such as hand operation, the rod member 120 will be moved leftward since the enlarged end 120b of the rod member follows the sloped cam surface portion 130f at first and then the higher cam surface portion 130e of the cam part formed on the branched lever portion 130b of the external operating member 130. This position of the rod member 120 is shown in FIG. 15. In this position, the ratchet lever 121 which has been also moved leftward with the leftward movement of the rod member, is out of alignment with the sub-ratchet gear 111 and therefore no engagement of the former with the latter is possible. Since, as previously noted, the second projection 139 is provided in the position corresponding to the higher cam surface portion 130e, the second projection of the external operating member 130 comes into contact with the extension part 135a of the swing lever 135 (see, FIG. 14) when the rod member 120 has reached nearly the limit of the movement. Thereafter, the swing lever is rotated about the pivot pin 136 clockwise upwards by the second projection 139. The swing lever thus rotated supports the rear projection 121c of the ratchet lever 121 from the underside of the projection (FIG. 17). As a result, the ratchet lever applies a pressure onto the extension 118b of the lever 118 so as to hold the inertia sensing member 116 in its right standing position. In this position, the ratchet lever 121 never engages with the sub-ratchet gear 111 even if the ratchet lever and the sub-ratchet gear are in the same plane as described above.

This position means the inoperative position of the emergency locking mechanism and this position corresponds to that shown in FIGS. 16 through 18.

Figure 19:
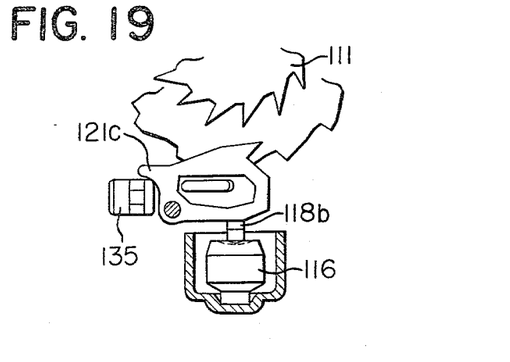
FIG. 19 is a similar view to FIG. 10 but showing the part in the position immediately before the emergency locking mechanism is released from its inoperative position.
Figure 20:
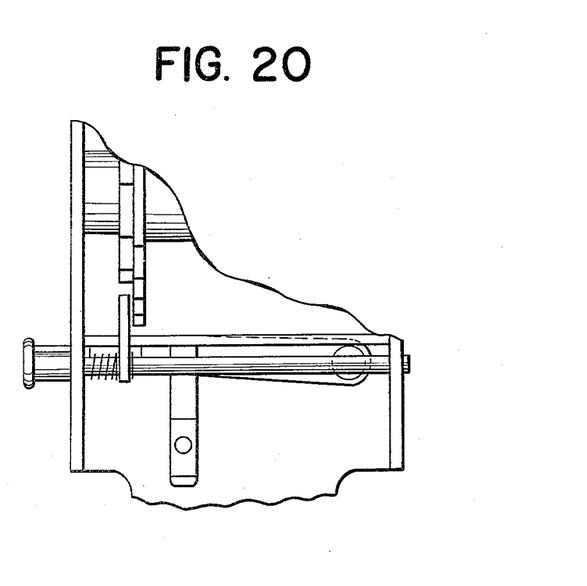
FIG. 20 is a similar view to FIG. 10 but showing the part in the position corresponding to FIG. 19.

In order to release the emergency locking mechanism from the above inoperative position, the external operating member 130 is rotated counter-clockwise from the position of FIG. 16 by hand operation or by using other suitable means. All the members more in the direction opposite to that described above for bringing the emergency locking mechanism inoperative and the rod member 120 returns to its starting position under the action of the compression spring 123. The ratchet lever 121 also returns to the position in which it is in alignment with the sub-ratchet gear 111. But, since, as previously noted, the second projection 138 of the operating lever 130 is provided in the position corresponding to the lower cam surface portion 130d, the swing lever 135 continues acting on the ratchet lever 121 during this time. The ratchet lever 121 is released from the restraint imposed by the swing lever only when the rod member 120 has returned to its starting position and the swing lever is rotated downwards by the first projection 138 formed on the branched lever portion 130b of the external operating member 130. FIGS. 19 and 20 show this phase of operation during which the emergency locking mechanism is returning to its operative position from the inoperative position. In this manner, the retractor again gets in the position in which it can be locked in an emergency.

As will be understood from the foregoing, the swing lever 135 serves to restrain the movement of the ratchet lever 121 after the latter has returned to the position in which it is in alignment with the sub-ratchet gear 111. The use of such swing lever brings forth various advantages. Firstly, during the returning movement, the inertia sensing member remains held in its right standing position. Therefore, any error in operation can be prevented. Secondly, there never occurs confliction of the ratchet lever 121 against the sub-ratchet gear 111 during the returning movement of the ratchet lever.

Figure 21:
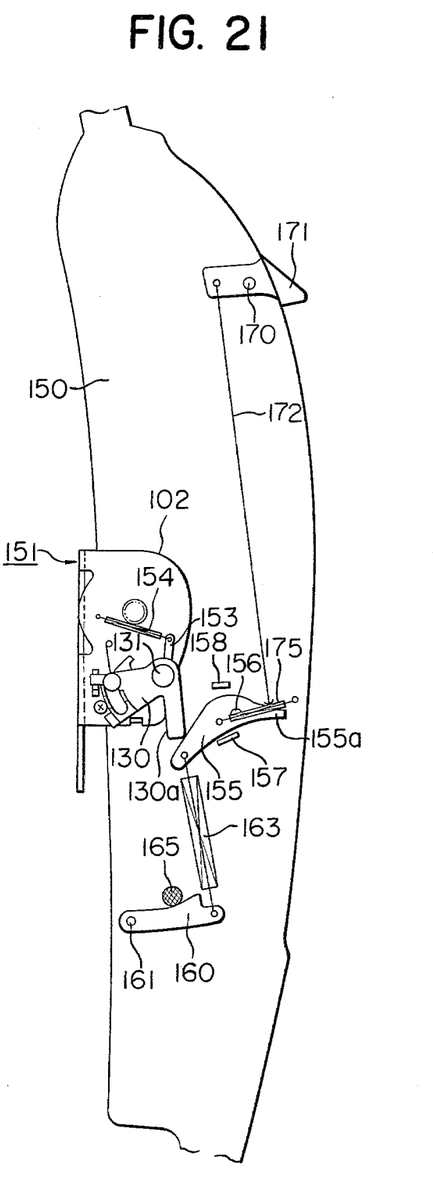
FIG. 21 shows the retractor of the above embodiment mounted in a door of the vehicle with the door being closed.
Figure 22:
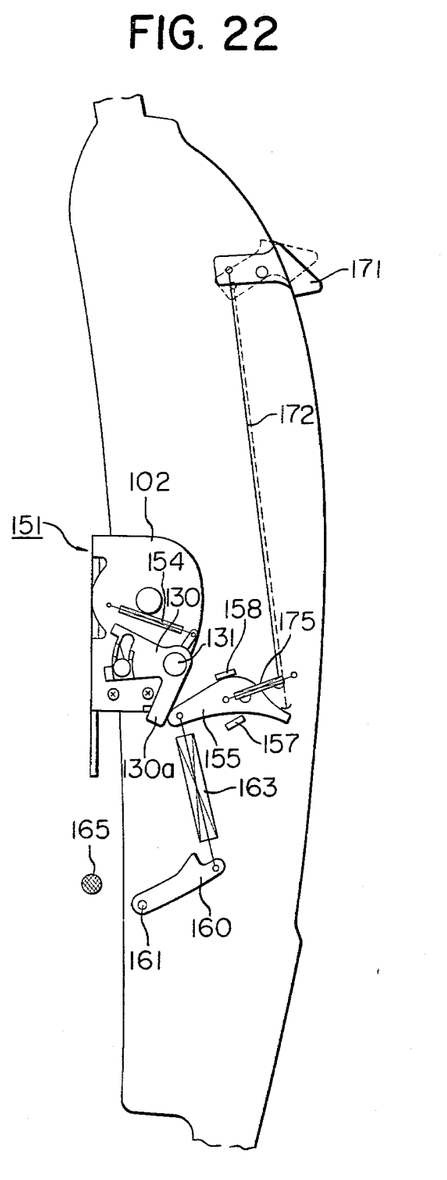
FIG. 22 shows the retractor with the door being opened.

Now, referring to FIGS. 21 and 22 an example of control of the emergency locking mechanism is described in which the emergency locking mechanism is controlled in link with the opening and closing motion of the door in which the above described retractor has been mounted or the motion of the knob of the door.

In FIGS. 21 and 22, the door in which the above described retractor 151 is mounted fixedly at a suitable place thereof is generally designated by 150, with FIG. 21 showing the door closed and FIG. 22 showing it opened.

On the side plate 102 of the retractor there is mounted the external operating member 130 rotatably about the pivot member 131. The external operating member has, as an integral part thereof, a second branched lever portion 153 extending in a direction opposite to the direction in which the external operating lever portion 130a extends. Between the second branched lever portion 153 and the retractor base side plate 102 there is interposed a tension coil spring 154 which has a bias force intending to rotate the external operating member 130 counter-clockwise. On the door 150, there is mounted a first cam member 155 rotatably about its pivot 156. The first cam member 155 is in contact with the above mentioned external operating lever portion 130 of the operating member 130 to control the rotation of the latter. The first cam member 155 is rotatable between two stoppers 157 and 158 secured on the door. When the first cam member 155 is in the first position in which the member 155 is in contact or close to the lower stopper 157, the external operating member 130 is in its first position, that is, in the downward rotated position in which emergency locking is allowed, under the action of the tension spring 154 (FIG. 21). When the first cam member 155 is rotated to the second position in which it is stopped by the upper stopper 158 (FIG. 22), the external operating member 130 follows the rotational movement of the first cam member and rotates clockwise against the force of the spring 154 up to its second position, that is, to the upward rotated position in which the emergency locking mechanism is made inoperative in the manner previously described.

On the lower part of the door there is provided a second cam member 160 rotatably about the pivot 161. Between the fore end portion of the second cam member 160 and that of the first one 155 there is interposed a tension coil spring 163. When the door 150 is closed, the second cam member 160 is struck by a striker 165 provided on the body side of the vehicle and thereby the second cam member is rotated clockwise so that the first cam member 155 is rotated to the first position. When the door is open, the second cam member 160 is held in the position shown in FIG. 22, that is, the upward rotated position.

The door 150 has a door knob 171 mounted rotatably about a pivot 170 in the well-known manner to close and open the door. The knob 171 has a control rod 172 pivotally supported thereon. The control rod extends up to the position near the arm 155a of the first cam member 155. When the door knob 171 is rotated in the direction to open the door from the position shown in FIG. 21 to the position suggested by the phantom line in FIG. 22, the free end of the control rod 172 pushes the arm 155a down so as to make the first cam member 155 rotate clockwise against the force of the coil spring 163. As a result, the first cam member is brought into its second position shown in FIG. 22. This movement of the first cam member causes in turn the external operating member to rotate clockwise. Thus, the external operating member 130 takes its second position shown in FIG. 22 to render the emergency locking mechanism of the retractor 151 inoperative.

When the door knob 171 is released, the knob and therefore the control rod 172 return to their starting positions under the action of biasing means not shown. In case that the door is in a completely or nearly closed state at this time, the external operating member 130 is rotated counter-clockwise and the emergency locking mechanism becomes operative since at this time the second cam member 160 has been brought into the position shown in FIG. 21 by the striker 165 and the first cam member 155 also has been allowed to return to its first position.

In case that the door is in its open state by actuating the door knob 171, the striker is apart from the second cam member 160. Therefore, even when the door knob 171 is released from one's hold and the door knob and the control rod 171 are returned to their starting positions, the first cam member 155 is held in the second position by the force of a spring 175 interposed between the cam member 155 and the door body. The spring 175 is so disposed as to allow the first cam member 155 to take two stable positions and to hold the first cam member in the position whenever it is in the above mentioned first position. Even if the door has become open by the shock of collision of the vehicle or other unwilling condition so that the second cam member 160 is released from the striker 165 of the vehicle body, the first cam member 155 is held at its first position unless the door knob 171 is actuated, thereby holding the emergency locking mechanism operative.

While the door knob has been shown as one of the type which is mounted at the outside of the door and is operated by hand from the outside of the door, the above described arrangement is also applicable to a door knob of other type which is operated by hand from the inside of the door, or other suitable manual operating means.

Now, referring to FIGS. 23 through 34, the third embodiment of the invention will be described in detail.

Figure 23:
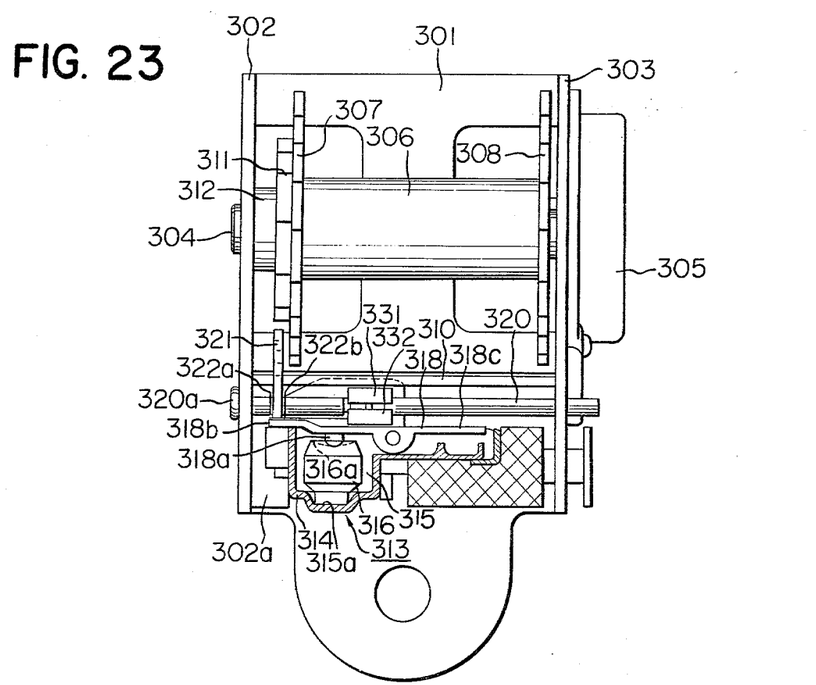
FIG. 23 shows the third embodiment of the invention in a partial cutaway front view.

In FIG. 23, the reference numeral 301 designates a base of a retractor used in safety belt device. The base has two parallel side plates 302 and 303 integrally formed with the base. At about middle of the length of the side plates 302, 303 there is rotatably supported a take-up shaft 304. At the right side end, as viewed in FIG. 23, of the take-up shaft 304, there is provided a taking-up spring (not shown) which intends to rotate the shaft 304 in the webbing taking-up direction. The taking-up spring is received and covered by a cover member 305 secured to the side plate 303. In the area between the two side plates 302 and 303, the take-up shaft 304 has a webbing take-up spool 306 with flanges 307 and 308 at the both ends mounted on the shaft as an integral part thereof to form together a take-up reel. On the circumference of each of the flanges 307, 308, there is formed a ratchet gear which is engageable with a locking member 310. When the ratchet gear is brought into engagement with the locking member in a manner as hereinafter described, it prevents the take-up reel from rotating in the webbing pulling-out direction so as to prevent a webbing (not shown) from being pulled out. On the take-up shaft 304 and adjacent to the above mentioned flange 307, there is also provided a sub-ratchet gear 311 the diameter of which is smaller than that of the flange 307. The ratchet gears on the flanges 307, 308 and the sub-ratchet gear are so formed as to have the same number of gear tooth. Between the base side plate 302 and the sub-ratchet gear 311, the take-up shaft 304 has also a cylindrical spacer 312 loosely fitted on it.

Figure 27:
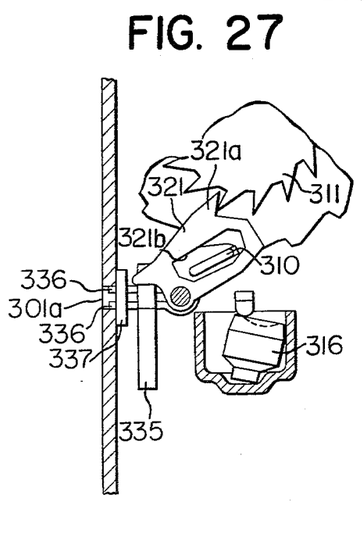
FIGS. 27 and 28 illustrate the manner of operation of the emergency locking mechanism in an emergency.

The base side plate 302 has a supporting projection 302a integrally formed within the lower edge portion of the side plate. Fixed to the supporting projection is a casing 314 containing therein a vehicle acceleration sensing means 313. The casing 314 includes a chamber having a flat bottom surface 315a on which an inertia sensing means 316 is placed. The inertia sensing member 316 normally stands right as shown in FIG. 23 and when any force is applied thereto as a result of change in speed of the vehicle beyond a predetermined level, it falls down as shown in FIG. 27. When the force exerting thereon is lost, the inertia sensing member returns again to its original position. Such type of inertia sensing means is well-known in the art. Of course, other type of inertia sensing means such as pendulum or ball may be used for this purpose. The inertia sensing member 316 has a recess 316a formed at its top portion to receive the projection 318a extending downwards from a lever 318 swing movably supported at the upper, middle portion of the casing. When the inertia sensing member 316 falls down, the lever 318 rotates about its fulcrum clockwise as viewed on the drawing of FIG. 23. The lever 318 has a fore end portion 318b extending toward the side plate 302 under the above mentioned sub-ratchet gear 311 and spacer 312. The sensitivity of the lever to the inclination of the inertia sensing member will be improved when the lever has a portion 318c extending in the direction opposite to the fore end portion relative to the fulcrum, that is, in the direction toward the other base side plate 303.

Slightly spaced upwards from the lever 318, there is a rod member 320 across the span between the two side plates 302 and 303. The rod member is mounted movably in the direction of its longitudinal axis relative to the side plates. A ratchet lever 321 serving as a sub-locking member is loose-fitted on the rod member at the end portion normally lying under the sub-ratchet gear 311. The ratchet lever 321 is rotatable relative to the rod member but not slide movable in the direction of the rod axis because of the presence of stop rings 322a, 322b. The portion of the rod member 320 projecting outwards from the side plate 302 is formed as an enlarged diameter portion 320a. The ratchet lever 321, in its free state, lies on the elongated fore end portion 318b of the lever 318 with its own weight. When the lever 318 is swing moved and its fore end portion 318b rises up, the ratchet lever is rotated about the rod member 320. During this rotation of the ratchet lever 321 a ratchet 321a formed thereon comes into engagement with the sub-ratchet gear 311. In the middle portion of the ratchet lever 321 there is formed an opening 321b through which the locking member 310 passes. To support the locking member, the side plates 302 and 303 have sectorial openings formed therein at the positions opposed to each other. (not shown) Normally, the locking member 310 is positioned, by its own weight and/or a spring (not shown) interposed between the member and the side plate 302 or 303, in a position in which the locking member can not engage with the ratchet gears formed on the flanges 307 and 308 of the take-up reel. However, when it is rotated in the sectorial openings up to its working position, the locking member comes into mesh with the ratchet gears so as to prevent the take-up reel from rotating in the webbing pulling-out direction to stop pull-out of the webbing in the manner described previously.

In emergency, the above described mechanism operates in the following manner:

At the time of collision or jamming on one's brakes, the speed of the vehicle changes abruptly and the extent of the change in speed exceeds a predetermined level. The inertia sensing member 316 senses such change in speed and inclines or falls down, which results in a rotation of the lever 318 about its fulcrum. The fore end portion 318b makes the ratchet lever 321 rotate about the rod member 320 so as to bring the ratchet 321a into the position engageable with the sub-ratchet gear 311. On the other hand, at this moment, the person wearing the safety belt on him and sitting in the vehicle falls forward due to the sudden change of the vehicle speed. As a result, the webbing is pulled out and therefore the take-up shaft and the take-up reel are rotated in the direction of webbing pull-out. The sub-ratchet gear 311 fixed on the take-up shaft is brought into engagement with the ratchet 321a of the ratchet lever so that the ratchet lever is further rotated. Since the locking member 310 passes through the opening 321b of the ratchet lever 321, the rotation of the ratchet lever causes the locking member to rotate up to the position in which the locking member comes into engagement with the ratchet gears formed on the flanges 307, 308 of the take-up reel. Thus, the take-up reel and therefore the take-up shaft are locked against rotation, and any further pulling-up of the webbing is stopped to fasten the safety belt upon the wearer.

Figures 25, 26:
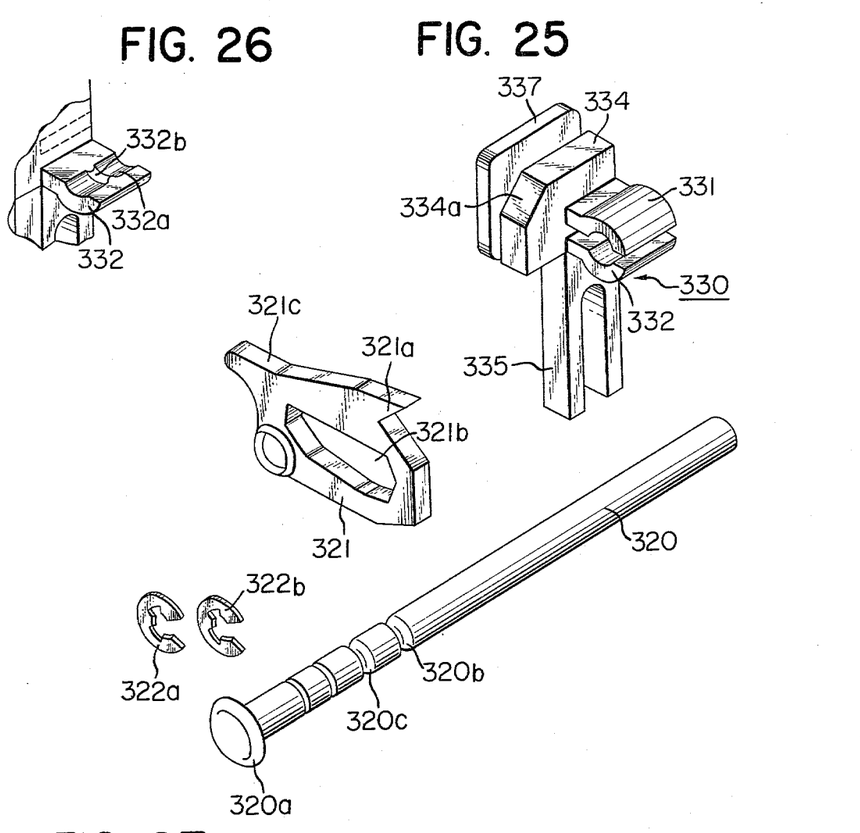
FIG. 25 is an exploded view of the essential part of the third embodiment.
FIG. 26 is a partial detail view of the operating member shown in FIG. 25.

FIG. 25 shows an operating member 330 used to externally operate the above described emergency locking mechanism. The operating member is mounted on the rod member 320 slidably movable in the axial direction of the rod member. The operating member 330 is operable with hand or by other suitable means linked with it as will be described hereinafter.

The structure and arrangement of the operating member 330 are described in detail with reference to FIGS. 23 through 34.

The operating member 330 includes a pair of guide members 331 and 332 loose-fitted on the rod member 320 in such manner as to embrace the rod member. In the inner surfaces of the guide members 331, 332 opposed to each other there are provided semicircular axial slots 331a, 332a the diameter of which is nearly equal to the outer diameter of the rod member. About the middle of the axial length of each the semicircular slot there is formed an inner circumferential projection 331b or 332b. One of the circumferential projections 332b is only visible on the drawing of FIG. 26. On the other hand, the rod member 320 has two circumferential slots 320b and 320c into which the above mentioned inner circumferential projections 331b and 332b of the guide member are fitted in a fashion of snap engagement to position the guide member relative to the rod member. These two circumferential slots are spaced from each other by a predetermined distance and provided in the area of the rod member relatively close to the ratchet lever 321 mounted thereon.

Figure 24:
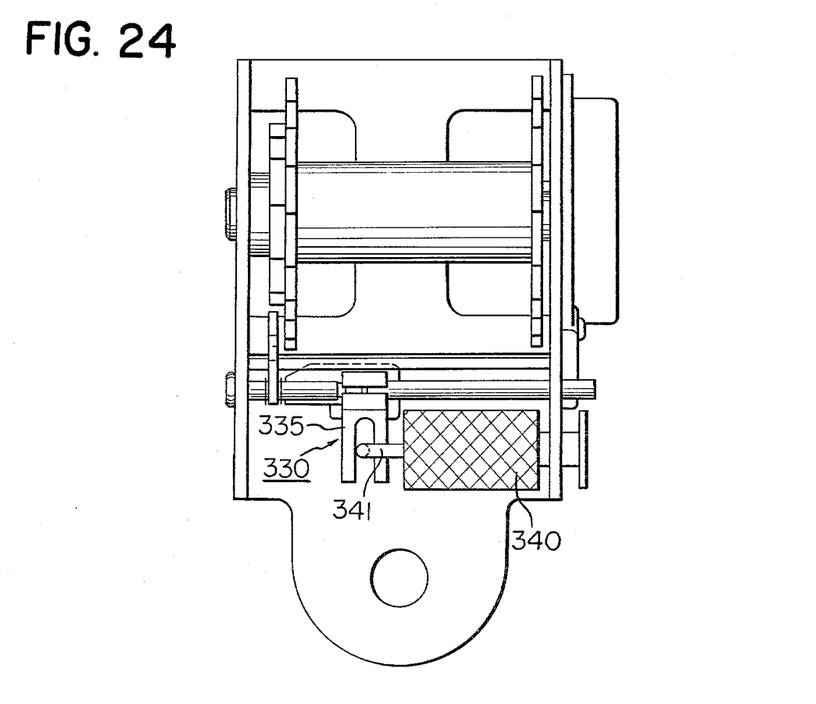
FIG. 24 shows it in the same view with the inertia sensing means being removed for clearness.

The operating member 330 has also a cam member 334 formed integrally with the guide member 331, 332. The cam surface 334a of the cam member is formed in such manner that when the circumferential projections 331b, 332b are snapped in the corresponding second circumferential slot 320c formed on the rod member, the cam surface may come into contact with the underside surface of the rear upward projection 321c of the ratchet lever 321 and may push it up so as to bring the ratchet lever into the position in which it can not engage with the sub-ratchet gear 311, and then hold the ratchet lever in the position. Integrally with the cam member 334 and extending downward therefrom, there is provided an operating portion 335 of the operating member 330. In this embodiment, the operating portion 335 is operatively connected with a driving member 341 which is moved in the axial direction by a solenoid 340 as shown in FIG. 24. In response to On and Off of the solenoid 340, the operating member 330 is moved on and along the rod member 320 through the driving member 341.

In order to prevent the operating member 330 from rotating about the rod member 320, as shown in FIG. 27, the cam member 334 has an elongated guide portion 336 at the side of the cam member facing the base 301 with the tip end of the elongated guide portion being fitted in an elongate bore 301a formed in the base 301 in parallel with the rod member 320. Further, to prevent the operating member from shaking and to assure a stable movement of it along the rod member, the operating member has also a contact plate portion 337 formed integrally with the elongated guide portion 336 in such manner that the surface of the contact plate portion may essentially contact with the surface of the base 301.

Figure 28:
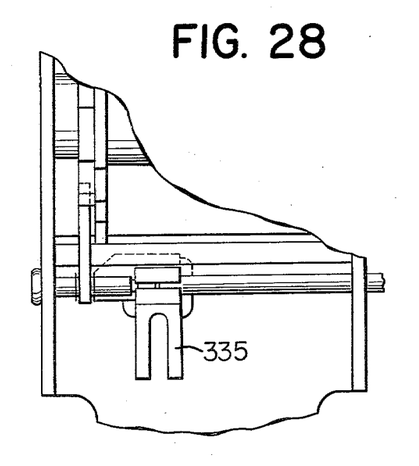

The manner of operation of the above described embodiment is as follows:

At first, FIGS. 23 and 24 show the above arrangement in the position in which an emergency locking can be effected. In this position, the operating member 330 takes the position in which the circumferential projection 331b, 332b formed in the guide members 331, 332 are in snap-engagement with the first circumferential slot 320b on the rod member 320. The ratchet lever 321, in this position, becomes independent of the operating member and normally the lower end of the ratchet lever is placed, by its own weight, on the fore end extension part 318b of the lever 318 near the inertia means 313. In this position, if there occurs a sudden change in speed of the vehicle and the inertia member 316 falls down as shown in FIG. 27, then the lever 318 will swing about its fulcrum and thereby the ratchet lever 321 will be rotated about the rod member 320 by the fore end portion 318b of the lever 318. Therefore, the ratchet 321a of the ratchet lever is brought into the position engageable with the sub-ratchet gear 311 provided on the take-up reel side. At the same time, the wearer of the seat belt will fall forward resulting in pulling out the webbing. As a result, the take-up reel and the sub-ratchet gear 311 are driven into rotation at a high speed and the ratchet of the ratchet lever 321 is engaged in the sub-ratchet gear so that the ratchet lever is further rotated about the rod member 320. Now, the locking member 310 comes into engagement with the main ratchet gears 307, 308 to stop the rotation of the take-up shaft. Thus, an emergency locking is effected. This position is shown in FIGS. 27 and 28.

Figure 29:
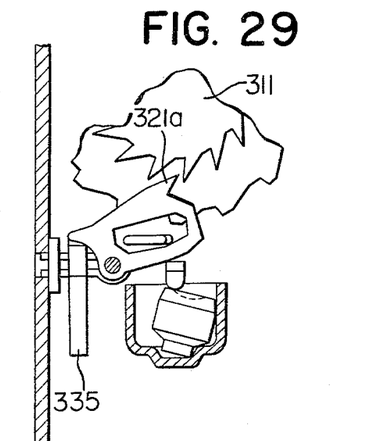
FIGS. 29 and 30 illustrate the manner of shift of the emergency locking mechanism from the operative position to its inoperative position.
Figure 30:
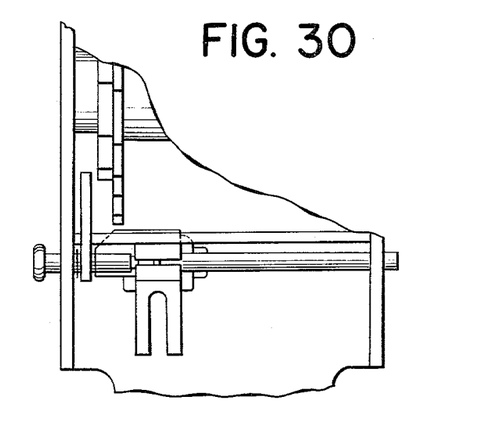

Closing or opening of the door in this locked position or in the position ready for effecting an emergency locking as shown in FIGS. 23 and 24 actuates the solenoid 340. By actuating the solenoid in this manner or by a hand operation or other external force, the operating member 330 can be moved in the direction toward the base side plate 302 along the length of the rod member 320. Together with the operating member 330, the rod member 320 and therefore the ratchet lever 321 are also moved in the above mentioned direction since, as shown in FIGS. 29 and 30, the inner circumferential projections 331b, 332b of the operating member are in engagement with the first circumferential slot 320b of the rod member at this time. Thus, the ratchet lever 321 is shifted from the position aligned with the sub-ratchet gear 311 to another position in which the ratchet lever can not engage with the sub-ratchet gear.

When the rod member 320 has moved a certain predetermined distance in the axial direction, a stop ring 322a on the rod member abuts against the base side plate 323 and any further movement of the rod member is prevented.

Figure 31:
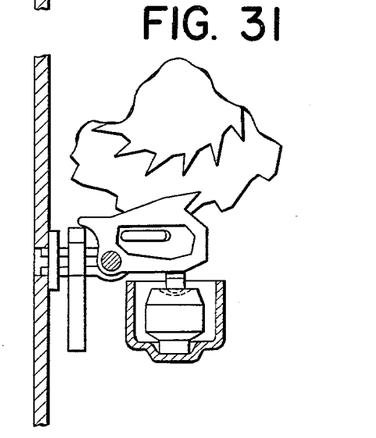
FIGS. 31 and 32 show the emergency locking mechanism which has been brought into its inoperative position.
Figure 32:
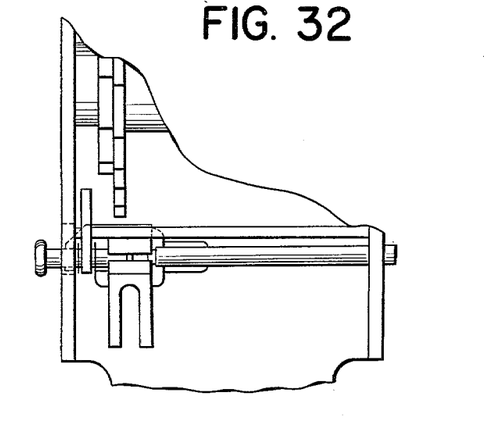
Figure 33:
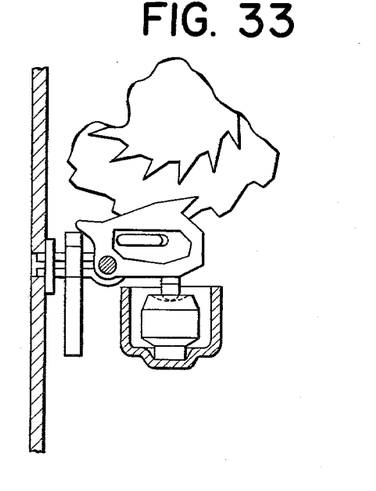
FIGS. 33 and 34 show the emergency locking mechanism which is again returning to the position in which the mechanism can effect an emergency lock.
Figure 34:
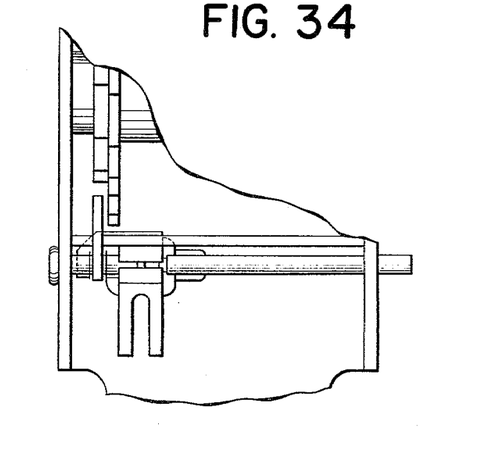

If the operating member 330 is further urged to move in the direction toward the side plate 302 by the driving force derived from the solenoid 340 or other external force such as hand operation, the snap engagement between the operating member and the rod member is removed forcedly since the stop ring 322a prevents any further movement of the rod member 320 at this time. With the inner circumferential projections 331b, 332b being slipped off from the first circumference slot 302b of the rod member, the operating member is allowed to further move on and along the rod member in the direction toward the side plate 302. During this movement, the cam surface 334a of the operating member 330 comes in contact with the rear upward extension 321c of the ratchet lever 321 and then pushes it upward so as to rotate the ratchet lever 321 about the rod member 320 to hold the inertia member 316 in its right standing position through the lever 318. In this position, the inner circumferential projections 331b, 332b of the guide member of the operating member 330 are engaged in the second circumferential slot 320c and continue to hold the position. This position of operation is shown in FIGS. 31 and 32.

If the operating member 330 is moved in the direction opposite to the direction described above from the above position by actuating the solenoid 340 in link with the motion of the door or by applying to the operating member an external force such as hand operation, then the ratchet lever 321 under the action of the cam member 334 of the operating member is moved in the axial direction up to its starting position (FIGS. 33 and 34) since, at this time, the guide members 331, 332 of the operating member are in engagement with the second circumferential slot 320c of the rod member. Since the ratchet lever is held by the cam member 334 in the position in which the ratchet lever never comes in mesh with the sub-ratchet gear 311, it is allowed for the ratchet to return to its starting position shown in FIG. 23 safely without any interfering with the sub-ratchet gear 311. The solenoid 340 or other external force will continue to drive the operating member 330. However, the enlarged portion 320a of the rod member 320 abuts against the base side plate 302 and thereby the rod member is prevented from moving further in the direction. This causes the guide members 331, 332 of the operating member to be disengaged from the second circumferential slot 320c of the rod member. Therefore, the operating member moves further in the axial direction on and along the rod member 320 and stops when it snaps in the first circumferential slot 320b on the rod member. As a result of this movement, the ratchet lever 321 is released from the holding action of the cam member 334 and it becomes rotatable about the rod member 320. In this manner, the retractor again takes the position ready for emergency locking. Namely, it returns back to the position shown in FIGS. 23 and 24.

Like in the case of the second embodiment particular advantages can be obtained also in this embodiment by releasing the ratchet lever 321 from the state held by the cam member only after the ratchet member has returned to the position in which the ratchet lever and the sub-ratchet gear 311 lie in the same plane. One of the advantages is that during the returning movement the inertia sensing member can be held in its right standing position, which eliminates any error of operation. Another is that the ratchet lever can return back to its starting position safely without any interfering with the sub-ratchet gear.

While the invention has been particularly shown and described with reference to preferred embodiments thereof, it will be understood by those skilled in the art that the foregoing and other changes in form and details can be made therein without departing from its spirit and scope of the invention.

What I claim is:

1. A system for making inoperative the emergency locking mechanism of an emergency lock type of retractor when there is no need for emergency locking comprising:

means for taking up a webbing, including a main gear and a subsidiary gear;
   inertia sensitive means for directly sensing a change of vehicle speed beyond a predetermined level;
   means for locking the take-up means to prevent pull-out of the webbing, said locking means including a subsidiary ratchet member engageable with said subsidiary gear in response to the sensing action of said inertia sensing means and a main ratchet member movable with said subsidiary ratchet member and engageable with said main gear to lock said take-up means; and a lever rotatably supported on the retractor and movable between a first position in which said lever allows a free movement of said subsidiary ratchet member and a second position in which said lever restrains the movement of said subsidiary ratchet member, said lever having a recess which engages a projection on the subsidiary ratchet member when the lever is in the second position, and said lever being moved to said second position when there is no need for emergency locking.

2. A system as claimed in claim 1, wherein said subsidiary ratchet member is moved by said lever in the same plane as said subsidiary gear to the position in which it cannot engage said subsidiary gear.

3. A system as claimed in claim 2, wherein said subsidiary ratchet member is rotationally moved by said lever.

4. A system as claimed in claim 1 wherein the retractor is mountable on a door of the vehicle, and said lever is movable between the first and second positions by the opening and closing motion of said door.

5. A system as claimed in claim 4, wherein said lever is rotatably supported on the base of the retractor and the free end of said lever projects outward from the door so as to directly detect the opening and closing of the door and move in response to the detected opening and closing motion of said door.

6. A system for making inoperative the emergency locking mechanism of an emergency lock type of retractor when there is no need for emergency locking comprising:

means for taking up a webbing, the take-up means including a main gear and a subsidiary gear;

inertia sensitive means for directly sensing a change of vehicle speed beyond a predetermined level;

means for locking the pull-out of the webbing including a subsidiary ratchet member engageable with said subsidiary gear in response to the sensing action of said inertia sensing means and a main ratchet member engageable with said main gear in link with said subsidiary ratchet member;

the subsidiary ratchet member being movable between a first axial position in which said subsidiary ratchet member and said subsidiary gear member lie in the same plane and are engageable with each other and a second axial position in which said subsidiary ratchet member is distant from said plane in the axial direction and unable to engage said subsidiary gear; and operating means for displacing said subsidiary ratchet gear between said first axial position and second axial position, and for holding said subsidiary ratchet gear in said first axial position when emergency locking is necessary and in said second axial position when there is no need for emergency locking.

7. A system as claimed in claim 6, wherein said operating means comprises a movable supporting member for supporting said subsidiary ratchet member and an operating member for moving said subsidiary ratchet member by moving said supporting member.

8. A system as claimed in claim 7, wherein the subsidiary ratchet member is rotatable between a position of disengagement from the subsidiary gear, an intermediate position and an operative position, the subsidiary ratchet member being movable from the disengagement position to the intermediate position by means of said inertia sensitive means and from the intermediate position to the operative position by pull-out of the webbing, the main ratchet member being moved from a disengaging position with the main gear to an engaging position by the movement of the subsidiary ratchet member from the intermediate position to the operative position; and holding means for holding said subsidiary ratchet member in its disengagement position, said holding means being operable by said operating member such that when said subsidiary ratchet member is in the second axial position said operating member causes said holding means to hold said subsidiary ratchet member in said disengagement position and such that when said subsidiary ratchet member moves from the second axial position to the first axial position, said operating member releases said subsidiary ratchet member.

9. A system as claimed in claim 7, wherein said supporting member is formed as a rod member disposed in the axial direction and movable in the axial direction and said subsidiary ratchet member is mounted on said rod member rotatably about it but unmovably in the axial direction along said rod member, and said operating member has a cam portion for moving said rod member in the axial direction.

10. A system as claimed in claim 9, wherein said operating member is supported rotatably on a side plate of the retractor.

11. A system as claimed in claim 9, wherein said operating member is able to take two different positions relative to said supporting member, a first position in which said operating member can move said supporting member and a second position in which said operating member holds said subsidiary ratchet member in its first axial position.

12. A system as claimed in claim 11, wherein said operating member is connected with said supporting member by a snap coupling having two snap coupling positions, that is, a first snap coupling position in which said operating member can move said supporting member and a second coupling position in which said operating member holds said subsidiary ratchet member in its first axial position.

13. A system as claimed in claim 11, which further comprises a solenoid driving means for driving said operating member.

14. A system for making inoperative the emergency locking mechanism of an emergency lock type of retractor when there is no need for emergency locking, comprising:

take-up means for taking up a webbing, the take-up means including a first gear;

inertia sensitive means for sensing a change of vehicle speed beyond a predetermined value;

means for locking the take-up means to prevent pull-out of the webbing, the locking means including a first member engageable with the first gear in response to the inertia sensing means sensing said change of vehicle speed beyond said predetermined value; and operating means for moving the first member between a first axial position in which the first member and the first gear are in the same plane and engageable with each other and a second axial position in which the first member is axially displaced from said plane and unable to engage the first gear, the operating means moving the first member to the second axial position when there is no need for emergency locking.

* * * * *